(12) United States Patent
Lewis et al.

(10) Patent No.: US 8,611,781 B2
(45) Date of Patent: Dec. 17, 2013

(54) METHOD AND DEVICE OF JOINING MULTIPLE PARTS OF A TONER CARTRIDGE

(75) Inventors: Lawrence Dale Lewis, Sanford, NC (US); Glenn L. Szabo, Sanford, NC (US); Donald R. Huck, Sanford, NC (US)

(73) Assignee: Static Control Components, Inc., Sanford, NC (US)

( * ) Notice: Subject to any disclaimer, the term of this patent is extended or adjusted under 35 U.S.C. 154(b) by 388 days.

(21) Appl. No.: 13/022,257

(22) Filed: Feb. 7, 2011

(65) Prior Publication Data
US 2012/0033990 A1    Feb. 9, 2012

Related U.S. Application Data

(60) Provisional application No. 61/303,107, filed on Feb. 10, 2010.

(51) Int. Cl.
*G03G 15/00*    (2006.01)
*G03G 15/08*    (2006.01)

(52) U.S. Cl.
USPC .......................................................... 399/109

(58) Field of Classification Search
USPC .................................................... 399/106, 109
See application file for complete search history.

(56) References Cited

U.S. PATENT DOCUMENTS

| | | | |
|---|---|---|---|
| 5,300,171 A * | 4/1994 | Braun et al. | 156/249 |
| 5,594,535 A | 1/1997 | Beaufort | |
| 5,937,238 A * | 8/1999 | Tremblay et al. | 399/109 |
| 6,289,188 B1 * | 9/2001 | Litman et al. | 399/109 |
| 6,577,830 B1 * | 6/2003 | Wazana et al. | 399/109 |
| 6,736,406 B1 * | 5/2004 | Provencher | 277/628 |
| 6,961,531 B2 | 11/2005 | Hoobing | |
| 6,993,265 B2 * | 1/2006 | Morgan | 399/106 |
| 7,197,260 B2 * | 3/2007 | Jones et al. | 399/106 |

* cited by examiner

*Primary Examiner* — William J Royer (57) ABSTRACT

Imaging devices, such as laser printers, often use a toner cartridge to print images on a recording medium. For both environmental and economical reasons, it is often desirable to reuse an exhausted toner cartridge. Some imaging devices use toner cartridges comprised of two sections that are fixed together with some limited movement. This limited movement is necessary to compensate for any misalignment in the toner cartridge and to reduce printer defects. Disclosed is a method and device for remanufacturing this type of toner cartridge.

34 Claims, 9 Drawing Sheets

METHOD AND DEVICE OF JOINING MULTIPLE PARTS OF A TONER CARTRIDGE

This application claims priority from U.S. Provisional Patent Application No. 61/303,107, filed Feb. 10, 2010, which is herein incorporated by reference in its entirety.

BACKGROUND

Electrostatic imaging devices, such as laser printers, photocopiers, facsimile machines, and all-in-one machines, use a toner cartridge to hold toner that creates an image. It is often desirable to reuse these toner cartridges for environmental or financial reasons.

Many laser printer toner cartridges are composed of two sections. The two sections are a hopper assembly and a waste bin assembly. The hopper assembly typically includes a mag section. In some toner cartridges, such as the HP CC364A & CC364X cartridges used in the HP P4515 series of printers, the mag section must be able to provide limited movement to compensate for misalignments and to reduce print defects from a rigid assembly.

It is often problematic when refilling or remanufacturing a toner cartridge with a moveable hopper because an area where the mag section is allowed to move or float is sometimes damaged, contaminated with toner, or inadvertently separated. Therefore, in order to utilize this used toner cartridge, it becomes necessary to reattach a floating area of the mag section to a rigid area that is mounted onto the hopper assembly half of the toner cartridge in a manner that still allows a moveable area to remain moveable.

SUMMARY

Disclosed is a method and system for refilling or reusing a toner cartridge composed of two sections. The method enables a mag section of the toner cartridge to be attached to a rigid area of the toner cartridge and to maintain movement between a portion of the mag section and the rigid area.

The method will allow for the reuse of toner cartridges that were previously very difficult to reuse. This in turn lessens the impact on the environment by preventing toner cartridges from being needlessly thrown away. Also, buyers of refilled or remanufactured toner cartridges are able to spend less financial resources.

Additionally, the disclosed system and method will allow for a portion of the mag section to retain the desired range of movement. This will allow the reused cartridge to function as capably as a new toner cartridge.

One disclosed method is a method of affixing two plastic members together. The method provides a gasket having a base layer with a first surface and a second surface, wherein the gasket has a pressure sensitive adhesive layer located on the first surface and a pressure sensitive adhesive located on the second surface. The gasket is fixed between a first plastic member and a second plastic member. Pressure is applied so that the pressure sensitive adhesive layer located on the first surface of the gasket is activated and the pressure sensitive adhesive layer located on the second surface of the gasket is activated.

Another disclosed method is for repairing or reusing a toner cartridge. This method includes providing a first portion of a used toner cartridge, wherein the first portion is to be rigidly mounted to a section of the used toner cartridge; providing a second portion of a used toner cartridge; and fixing the second portion to the first portion, wherein the second portion is fixed so that it has limited movement when fixed to the first portion.

In order to reassemble a toner cartridge, a novel gasket may be used. The gasket comprises a base layer having a first side and a second side. A first adhesive layer is located on the first side of the base layer and a second adhesive layer is located on the second side of the base layer. A first liner is located on the first adhesive layer and a second liner is located on the second adhesive layer.

Using the disclosed methods and apparatus allows for an assembler to provide a remanufactured toner cartridge comprising a first portion of a toner cartridge, a second portion of the toner cartridge, and a device for fixing the first portion to the second portion. The device fixes the first portion to the second portion in a manner which allows for limited movement between the first portion and the second portion.

These and other features and objects of the invention will be more fully understood from the following detailed description of the embodiments, which should be read in light of the accompanying drawings.

In this regard, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description, serve to explain the principles of the invention.

DETAILED DESCRIPTION OF THE DRAWINGS

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

There are several different methods to reaffix two plastic housing members together in a manner that will permit continued but limited movement. The methods detailed in the embodiments below are a collection of options that can be utilized to address this task however variations of the descriptions may exist and therefore this document should be viewed in the broadest sense to incorporate both the detailed descriptions as well as variations of the descriptions.

Additionally, there are certain parameters that must be incorporated into each of the embodiments in order to ensure an effective solution. One example of this is the use of adhesive in several of these methods. The properties and characteristics of adhesive play an important part in the applications discussed here.

Adhesive that is too thin may experience bonding deficiencies and require a more aggressive bond strength. The thinner adhesive will require more effort to assure a proper bond between the adhesive and its substrates. Therefore, the physical adhesive properties would need to be exponentially higher.

Furthermore, a thinner adhesive typically does not bond completely on non-uniform surfaces and may change the intended operational efficiency of the design as well as the interface between the two functioning components. Some adhesive properties are not compatible with a construction of a flexible substrate integral to a movable portion of a mag section.

In an exemplary toner cartridge, a space between a fixed portion and the movable portion of the mag section is approximately 0.1875 inches. This provides approximately 0.110 to 0.125 inches of travel between two cartridge portions. Therefore, a solution that is approximately 0.120 to 0.125 inch thick would severely limit the travel of the movable portion. Thus, it is desirable that any attaching solution, such as an adhesive, is less than 0.032 inches in thickness. Above 0.032 inches, a component used to bond the fixed and movable portions begins to compress a foam thereby reducing its effectiveness.

Some properties of concern for this application is bond strength, adhesive thickness, tactility, and peel adhesion. It is desirable to have a bond strength that is as high as possible without sacrificing the mobility of the flexible substrate. It is desirable to have an adhesive thickness such that a spring force of tension springs on either side of the mag section retains its full travel distance. Adhesive that is too thin has bonding issues while adhesive too thick limits the mobility of the movable portion of the mag section.

Tactility and peel adhesion both relate to an adhesive's ability to form a strong bond. Tactility is the measure of initial contact adhesion of the material whereas peel adhesion is a measurement of the force required to pull a base material (adhesive) from a host material (applied surface) in a uniform manner at or near a 180 degree pull direction.

These four properties (bond strength, adhesive thickness, tactility, and peel adhesion) must all be mixed at the proper proportions to satisfy the function and dependability of the assembly. In the following embodiments where referencing an adhesive, the above description of properties and characteristics must be considered to ensure the appropriate adhesive is utilized for a given method.

FIG. 2 through FIG. 5 illustrate one embodiment. In this embodiment, a rigid gasket 200 is utilized in place of a hot melt used by an original equipment manufacturer (OEM). The gasket 200 is comprised of a thin material, such as a high impact polystyrene (HIPS) or other plastic or non-metallic material with similar property characteristics. Pressure sensitive adhesive 310 is added to both sides of a base layer 300 of the gasket material with a liner 320 used to protect the adhesive 310 in storage until it is ready to be peeled off for use.

In order to join a fixed portion 210 to a moveable portion 220 of a toner cartridge, an assembler removes one liner 320 from the gasket 200. The assembler then applies the gasket 200 to the fixed portion 210 of the toner cartridge. The assembler may use a S-shaped tool 600 shown in FIG. 6 to apply pressure to the gasket 200. Alternatively, the assembler may use any other suitable tool or no tool at all to apply pressure to the gasket 200. The applied pressure causes the adhesive 310 to bond the gasket 200 to the fixed portion 210.

Figure 6:
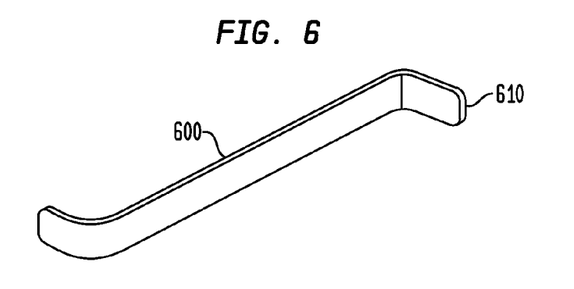
FIG. 6 illustrates a tool useful in implementing the disclosed method.

Next, the assembler removes the remaining liner 320 from the gasket 200 to expose the remaining adhesive 310. The assembler then places the moveable portion 220 of the toner cartridge onto the gasket 200. The assembler then uses the tool 600 to apply pressure to the gasket 200 activating the adhesive 310 to form a bond. The shape of the tool 600 allows the assembler to apply sufficient pressure to activate the adhesive 310 while the two portions 210,220 are being joined.

In an alternative embodiment, the assembler fixes the gasket 200 to the moveable portion 220 and then fixes the fixed portion 210 to the gasket 200. In another embodiment, the assembler removes a liner 320 and places the gasket 200 on one of the two portions 210,220 of the toner cartridge without applying sufficient pressure to activate the adhesive 310. The assembler then removes the remaining liner 320 and joins the two portions 210,220 together by applying pressure that is sufficient to activate the adhesive 310.

Once the two portions 210, 220 are joined together, it is critical to ensure that the adhesive 310 on both sides of the gasket 200 is sufficiently activated to ensure a strong and uniform bond. With the two portions 210, 220 assembled together however, applying proper pressure to the installed gasket 200 may be difficult as the gasket 200 is no longer visible or easily accessed. To solve this challenge, the tool 600 may be used. In one embodiment, the tool 600 has a soft pad 610.

Figure 7:
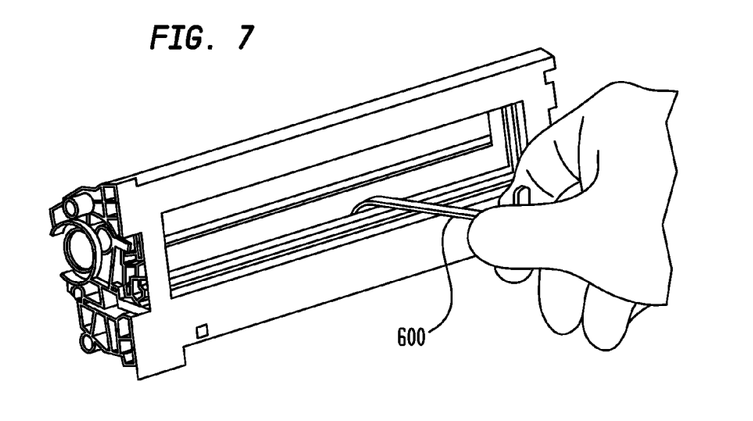
FIG. 7 illustrates using the tool to implement the method.
Figure 8:
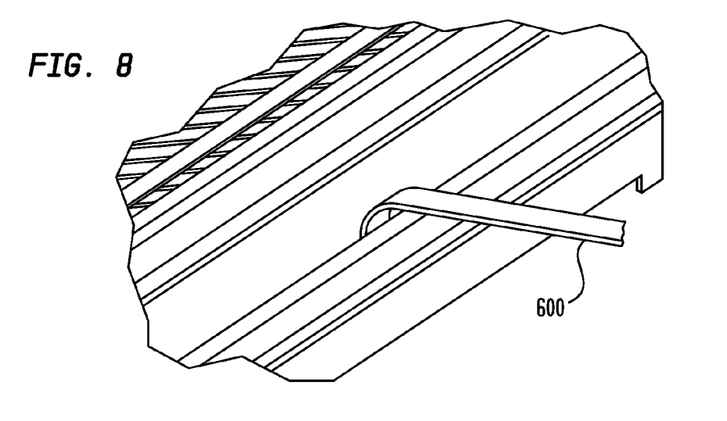
FIG. 8 is a close-up view of FIG. 7.

The shape of the tool 600 permits the assembler to insert the tool 600 into an opening between the fixed portion 210 and movable portion 220 of the mag section and apply sufficient pressure while moving the tool 600 in a uniform manner around the entire perimeter of the gasket 200. See FIG. 6 and FIG. 7. The soft pad 610 on the inside of the tool 600 provides a soft surface so that pressure is applied without scraping, gouging, or otherwise damaging the gasket 200, the mating parts, or other nearby components and features.

In another embodiment, the OEM hot melt material is replaced with a pliable caulk material. The assembler uses a dispensing device, such as a caulk gun or tube, and applies the pliable caulk material in a layer of a desired thickness onto either the fixed portion 210 or the moveable portion 220. The pliable caulk may be permanently applied or may be periodically replaced by the assembler as needed. Also, any other adhesive material with properties similar to the pliable caulk may be used instead of the pliable caulk.

Figure 9:
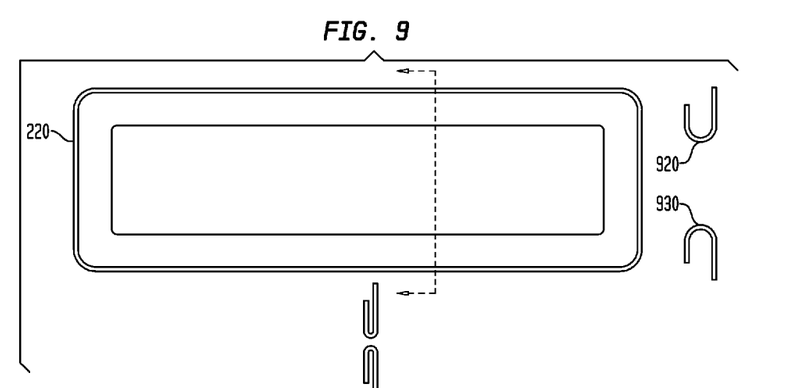
FIG. 9 illustrates a sheet used to join the toner cartridge parts.
Figure 10:
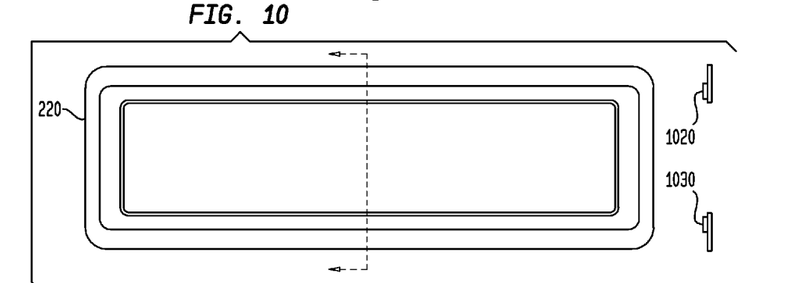
FIG. 10 illustrates another sheet used to join the toner cartridge parts.

In another embodiment, mounting features are placed on the movable member 220 rather than the fixed portion 210. The movable portion 220 may be a soft pliable sheet of plastic or rubber that is affixed to the plastic and held between a cartridge portion and a metal framework as shown in the top portion of FIGS. 1, 2, and 5. A connecting mechanism to mount the fixed portion and movable portion together could be a formed feature 920 of a sheet as shown in FIG. 9 or it may be a separate component of that sheet such as a layer of adhesive as shown in FIG. 10. The formed feature 920 may include an adhesive 930 to bond the formed feature 920 to the cartridge portion. Although two examples of this embodiment are shown, there are many other methods that could be used to connect the moveable portion 220 to the fixed portion 210. All of the possible variations are included as part of this embodiment. Tool 600 may be used to help properly fix the moveable portion 220 to the fixed portion 210. Furthermore, it is possible to implement both embodiments without using any specialized tools.

FIG. 10 illustrates an embodiment similar to FIG. 9 where a feature includes a foam 1020 located on one portion. An adhesive 1030 may be located on or near the foam 1020. The feature is used to connect the moveable portion 220 to the fixed portion 210 while the foam 1020 helps provide movement and prevents damage to either portion 210, 220 of the toner cartridge.

Figure 11:
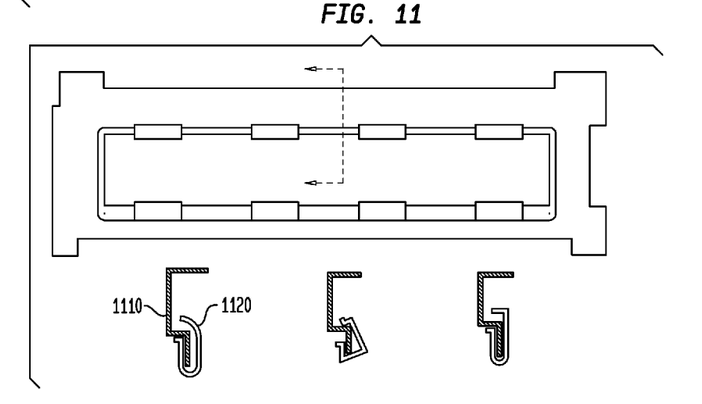
FIG. 11 illustrates a component used to join the toner cartridge parts.

FIG. 11 illustrates an embodiment where a component is provided to fix the moveable portion 220 to the fixed portion 210. In this embodiment the component may be a retaining clip or similar device. The component is used to secure the two portions of the plastic cartridge portion. The component includes a rigid piece 1110 and a clip 1120 located on a portion of the rigid piece. The clip is used to secure the rigid piece onto a portion of the cartridge and still allows for movement between the rigid piece and the cartridge. An advantage of this embodiment is that no adhesive material is used so the assembler does not need to use pressure to secure the rigid piece to the cartridge. As an alternative, the gasket could be provided with a snap feature to permit assembly without any adhesive making it easier to replace if worn or damaged.

Figure 1:
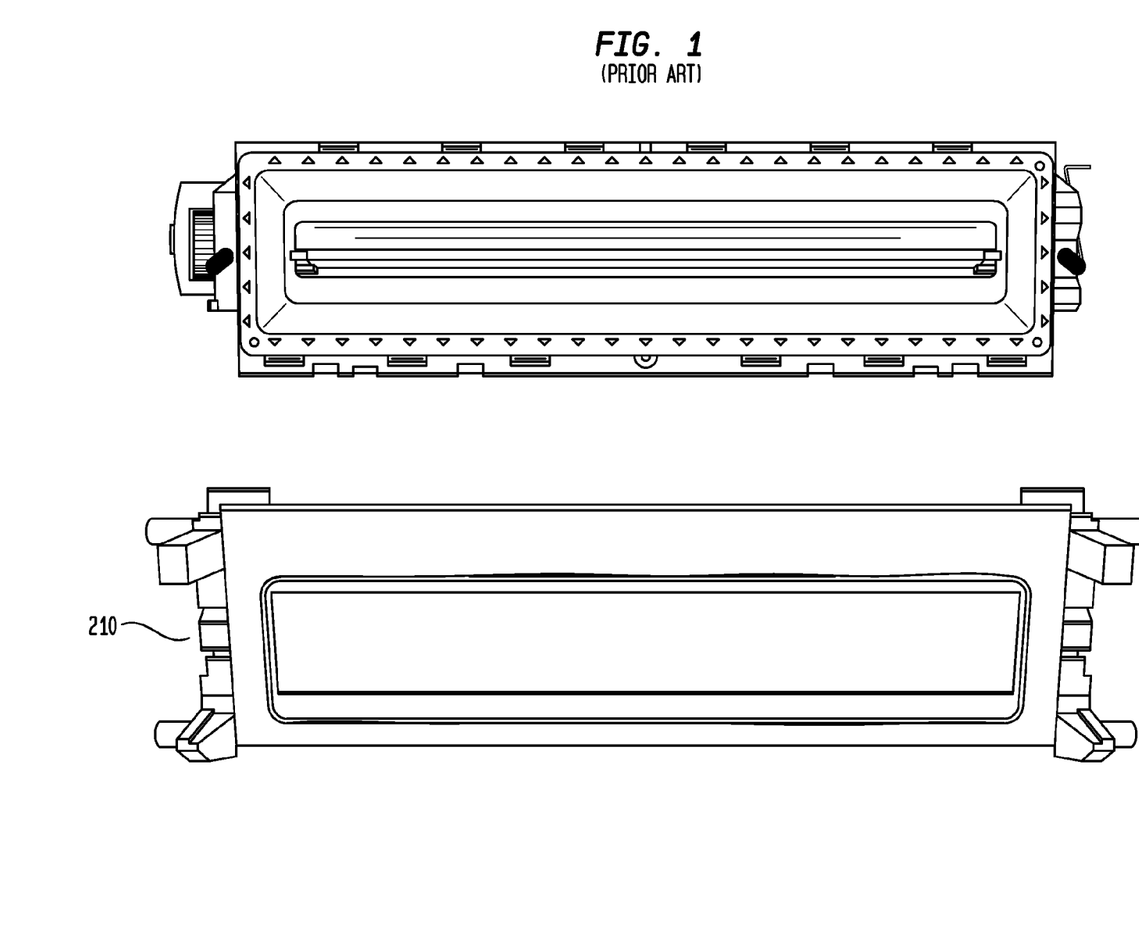
FIG. 1 illustrates a prior art toner cartridge assembly.
Figure 2:
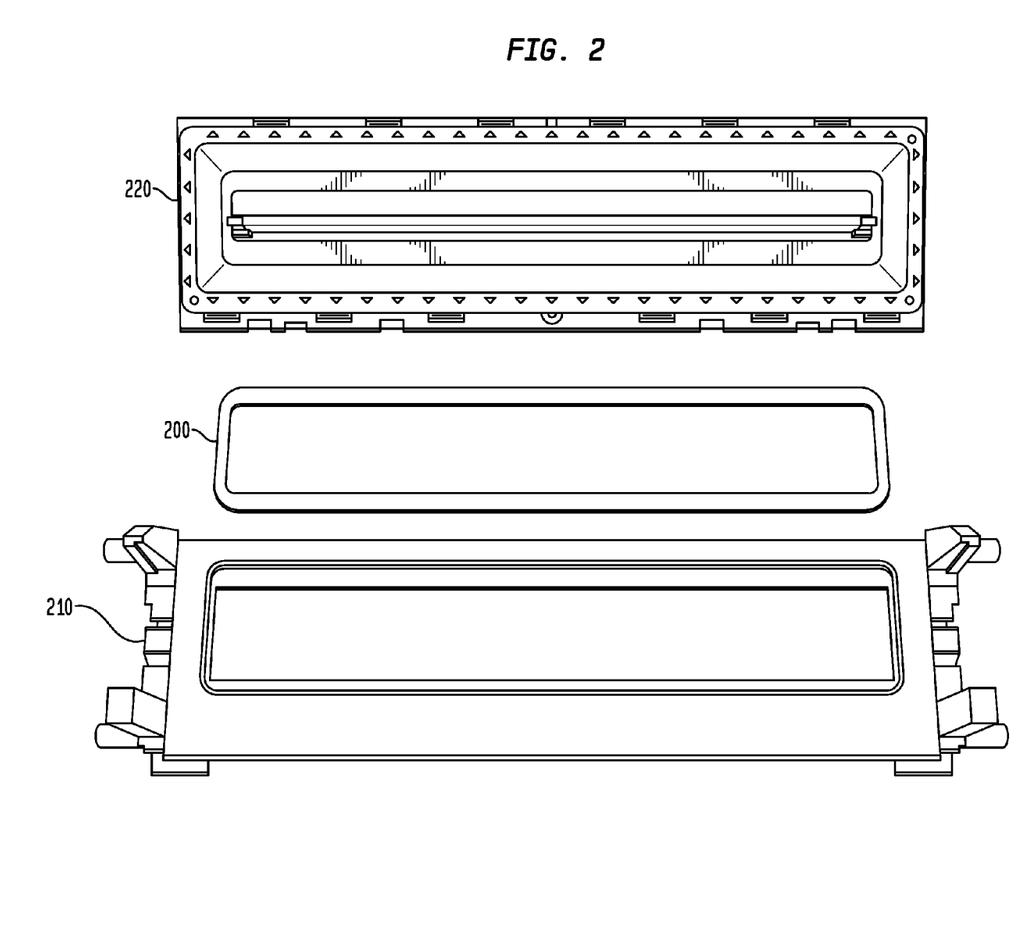
FIG. 2 illustrates an assembly using a gasket to join toner cartridge parts.
Figure 3:
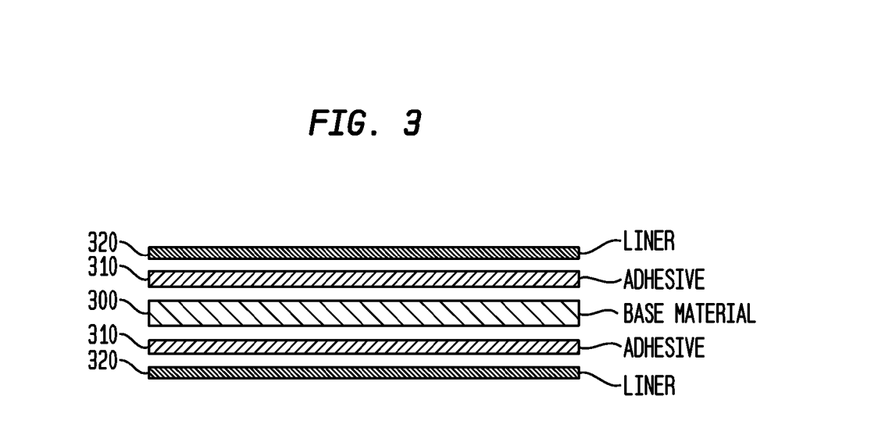
FIG. 3 is a view of the gasket.
Figure 4:
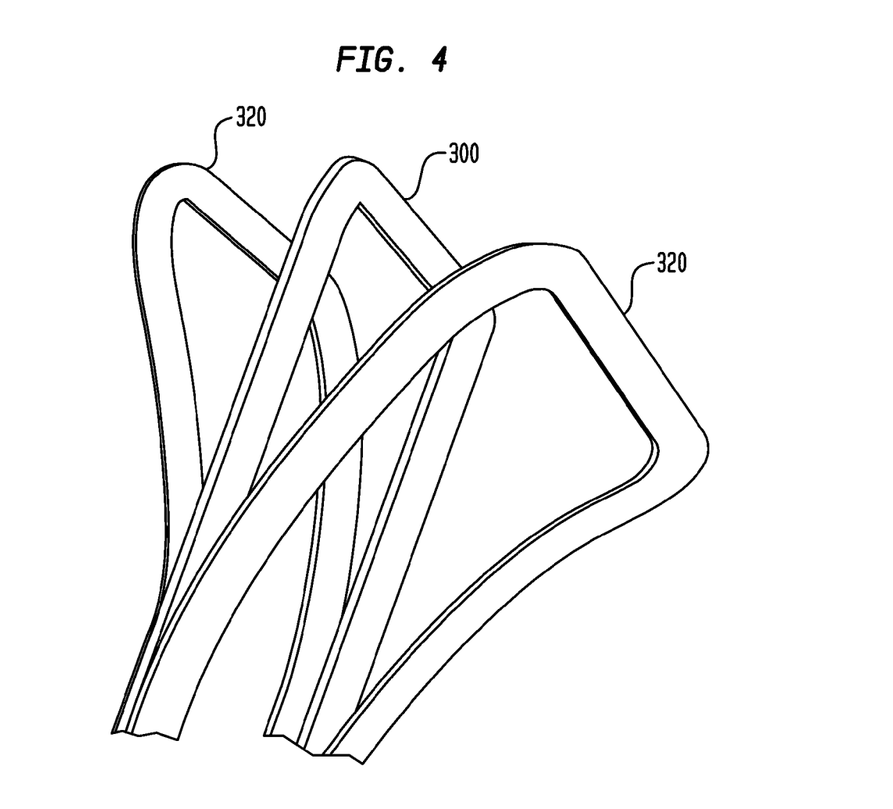
FIG. 4 illustrates a gasket with layers partially peeled away.
Figure 5:
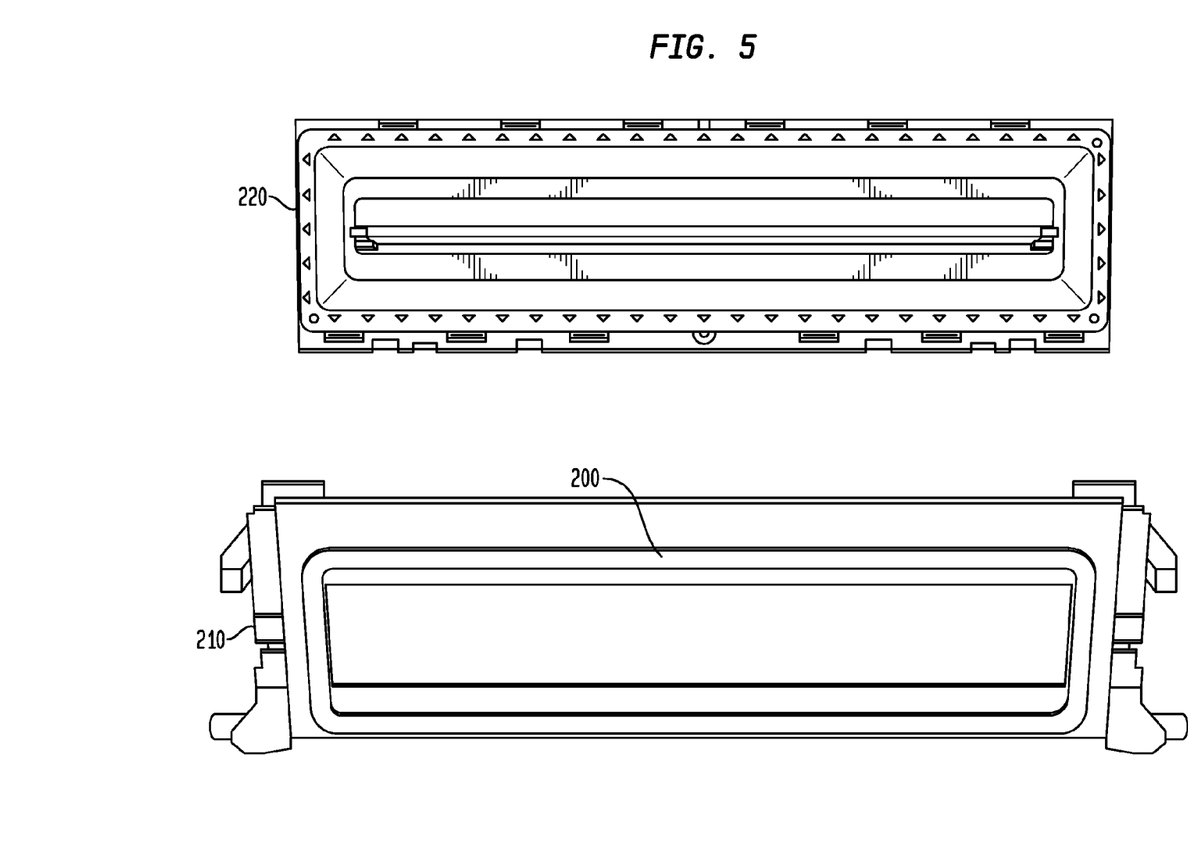
FIG. 5 shows the gasket fixed onto a part before reassembly of a toner cartridge is complete.
Figure 12:
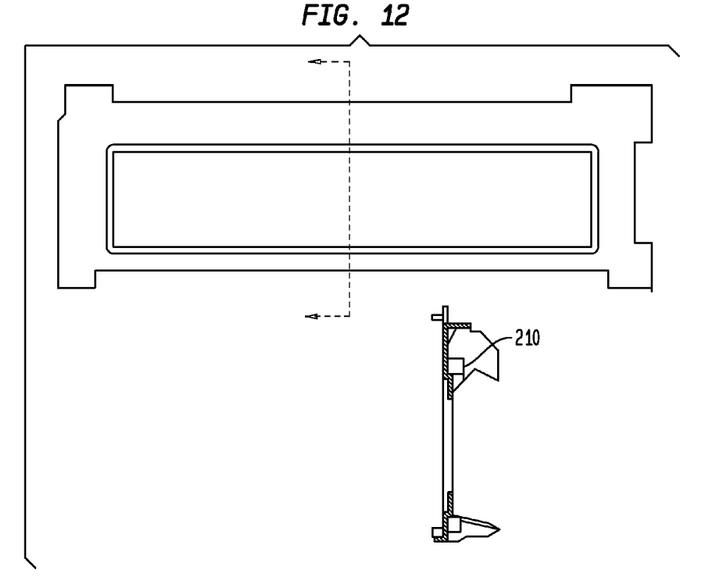
FIG. 12 illustrates using a cushioning material with an adhesive to join the toner cartridge parts.
Figure 13:
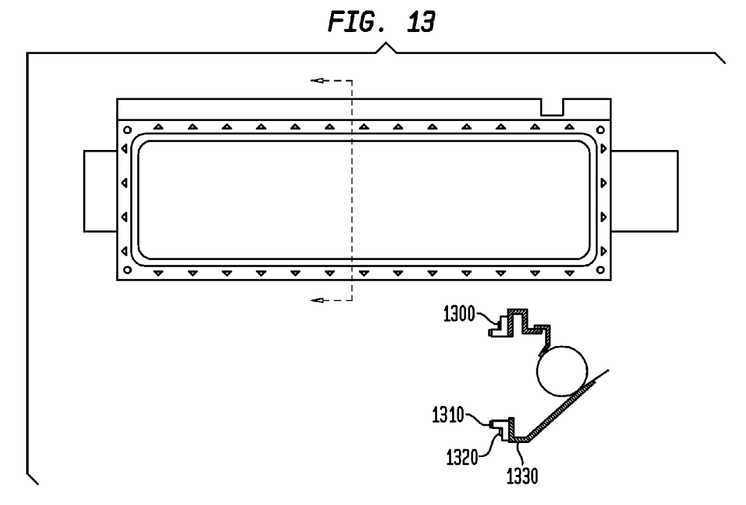
FIG. 13 illustrates the cushioning material mounted on a moveable section of a toner cartridge.

FIG. 13 illustrates an embodiment where a foam 1300, or other cushioning material, is used instead of the rigid plastic material or base layer 300. The foam 1300 may have adhesive 1310 on both sides to fix the foam 1300 to the moveable portion 220 and the fixed portion 210. Alternatively, the foam 1300 can include a clip or other known device for fixing to the portions 210, 220. In FIG. 12, a foam 1300 is mounted to the fixed portion 210 of the toner cartridge while in FIG. 13 the foam 1300 is mounted on the movable portion 220. The adhesive 1310 is located on a metal sheet 1320 which is attached to plastic 1330. This method could replace the OEM hot melt as shown in FIG. 1, or both the rubber material on the movable portion 220 as well as the hot melt material. The thickness of the foam 1300 and cushioning properties of the foam 1300 can be selected to give the desired movement range between the two portions 210, 220.

Figure 14:
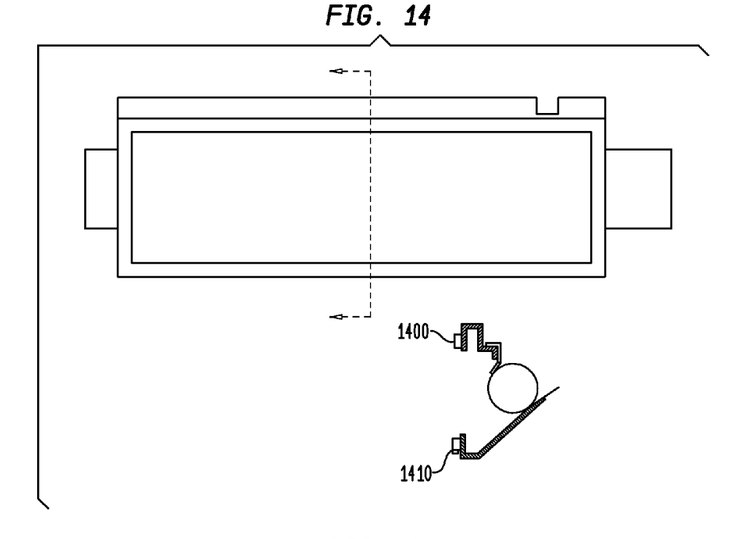
FIG. 14 illustrates an embodiment where the moveable section of the toner cartridge is replaced.

In another embodiment an entire section of the movable portion 220 is replaced. FIG. 14 illustrates a separate design utilizing the same or similar metal sheet 1320 with a foam 1400, spring, cushion type material or similar arrangement is used to provide the limited travel of movement. An adhesive 1410 is located on both sides of a plastic portion.

Figure 15:
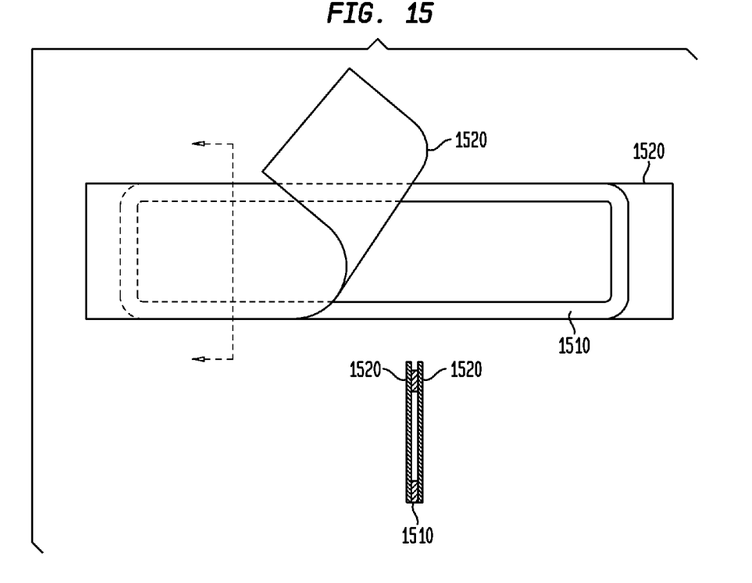
FIG. 15 illustrates an embodiment using a frame of adhesive between two release liners.
Figure 16:
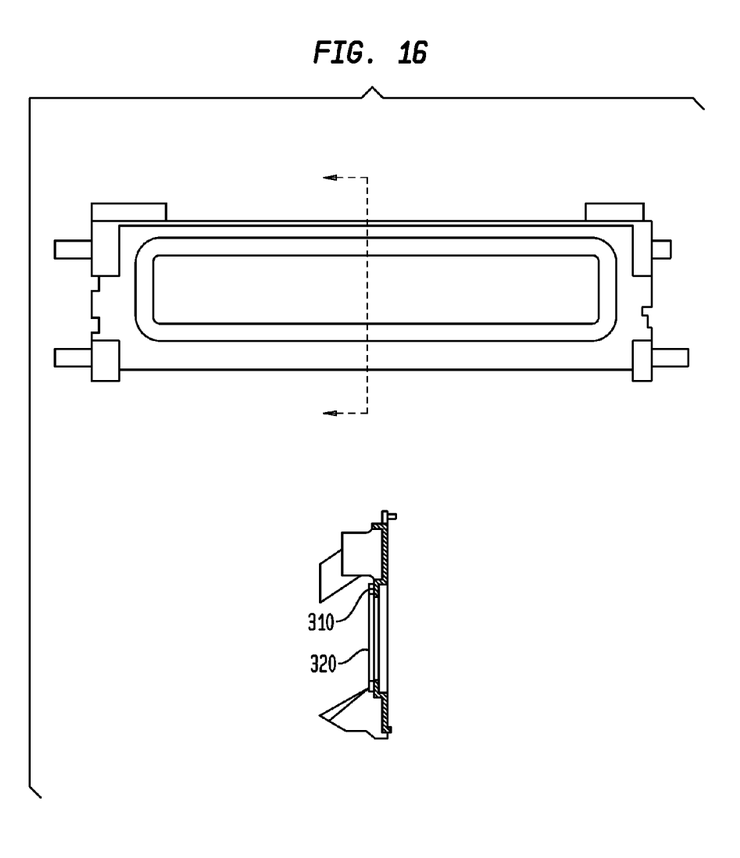
FIG. 16 shows another view of the frame of adhesive between two release liners.

FIG. 15 illustrates an embodiment having a frame of adhesive layers 1510 between two release liners 1520 with different removal properties. The release liner 1520 with a lighter removal value is peeled away exposing one side of the adhesive layer 1510. The second release liner 1520 may be clear to be used as a tool for placement onto a functional surface of the fixed portion 210 of a cartridge section, as shown in FIG. 16. Once the adhesive layer 1510 is in place, the remaining adhesive release liner 1520 is removed exposing the adhesive layer 1510 for joining the surfaces of the fixed portion 210 and the movable portion 220. The two portions 210, 220 are then assembled together. The assembler may provide pressure as necessary to insure proper bonding. The pressure may be applied by hand, by using the tool 600, or by using any other suitable means to obtain the necessary pressure.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method of affixing two plastic members together comprising:

providing a gasket having a base layer with a first surface and a second surface, wherein the gasket has a pressure sensitive adhesive layer located on the first surface and a pressure sensitive adhesive located on the second surface;

placing the gasket between a first plastic member and a second plastic member, wherein the first plastic member has a rigid portion and the second plastic member has a moveable portion; and applying a pressure so that the pressure sensitive adhesive layer located on the first surface of the gasket is activated and the pressure sensitive adhesive layer located on the second surface of the gasket is activated, wherein activation of the pressure sensitive adhesive layer located on the first surface of the gasket and activation of the pressure sensitive adhesive layer on the second surface of the gasket fixes the moveable portion of the second plastic member to the rigid portion of the first plastic member in a manner that allows the moveable portion of the second plastic member to remain moveable.

2. The method of claim 1, wherein the pressure is applied by using an "S" shaped tool.

3. The method of claim 1, wherein the gasket initially has two liner layers and the two liner layers are removed before the moveable portion of the second plastic member is fixed to the rigid portion of the first plastic member.

4. The method of claim 1, wherein the two plastic members are sections of a toner cartridge and the movement between the rigid portion of the first plastic member and the moveable portion of the second plastic member allows for compensation for misalignment between the sections.

5. The method of claim 1, wherein the base layer of the gasket is a thin non-metallic material.

6. The method of claim 5, wherein the base layer of the gasket is plastic or a high impact polystyrene material.

7. A method for repairing or reusing a toner cartridge, the method comprising:
   providing a first portion of a used toner cartridge, wherein the first portion is to be rigidly mounted to a section of the used toner cartridge;
   providing a second portion of a used toner cartridge, wherein the second portion includes a moveable portion; and
   fixing the second portion to the first portion, wherein the second portion is fixed so that it has limited movement when fixed to the first portion.

8. The method of claim 7, wherein the first portion is fixed to the second portion using an adhesive material.

9. The method of claim 8, wherein the adhesive material is one or more layers located on a gasket.

10. The method of claim 8, wherein the adhesive material is a pliable caulk.

11. The method of claim 8, wherein the adhesive material is less than 0.120 inches thick after being applied.

12. The method of claim 8, wherein the adhesive material is less than 0.032 inches thick after being applied.

13. The method of claim 7, wherein the first portion is fixed to the second portion by a joining feature.

14. The method of claim 13, wherein the joining feature is a sheet.

15. The method of claim 13, wherein the joining feature is a sheet having an adhesive located thereon.

16. The method of claim 13, wherein the joining feature is has one or more retaining clips used to connect to a first plastic feature or a second plastic feature.

17. A gasket comprising:
   a base layer having a first side and a second side;
   a first adhesive layer located on the first side of the base layer;
   a second adhesive layer located on the second side of the base layer;
   a first liner located on the first adhesive layer; and
   a second liner located on the second adhesive layer, wherein a thickness of the gasket is less than a predetermined thickness and the thickness of the gasket is such that the gasket can be used to join two plastic parts together in a manner that allows for movement between a fixed rigid portion of one plastic part and a moveable portion of a second plastic part.

18. The gasket of claim 17, wherein the first adhesive layer and the second adhesive layer are comprised of a pressure sensitive adhesive.

19. The gasket of claim 17, wherein the base layer is comprised of a flexible material.

20. The gasket of claim 17, wherein the base layer is comprised of plastic material.

21. The gasket of claim 17, wherein the gasket is used to join two parts of a toner cartridge together.

22. The gasket of claim 21, wherein the thickness of the gasket is less than 0.032 inches.

23. The gasket of claim 21, wherein the toner cartridge is a remanufactured or recycled toner cartridge.

24. The gasket of claim 21, wherein the toner cartridge is used in a Hewlett-Packard printer.

25. A remanufactured toner cartridge comprising:
   a first portion of a toner cartridge having a rigid part;
   a second portion of the toner cartridge having a moveable part; and
   a device for fixing the rigid part of the first portion to the second portion, wherein the device fixes the rigid part of the first portion to the section portion in a manner which allows for limited movement between the first portion and the moveable part of the second portion.

26. The remanufactured toner cartridge of claim 25, wherein the limited movement allows for compensation for misalignment between the first portion and the second portion and to reduce print defects.

27. The remanufactured toner cartridge of claim 25, wherein the device for fixing includes an adhesive material.

28. The remanufactured toner cartridge of claim 25, wherein the device for fixing is a gasket having a base layer and two adhesive layers.

29. The remanufactured toner cartridge of claim 25, wherein the device for fixing is a layer of adhesive material.

30. The remanufactured toner cartridge of claim 29, wherein the layer of adhesive material is a flexible caulk.

31. The remanufactured toner cartridge of claim 25, wherein the device for fixing includes a joining feature.

32. The remanufactured toner cartridge of claim 31, wherein the joining feature is a clip.

33. The remanufactured toner cartridge of claim 31, wherein the joining feature includes an adhesive material.

34. The remanufactured toner cartridge of claim 31, wherein the joining feature includes a foam or cushioning material.

* * * * *